United States Patent
Xie et al.

(10) Patent No.: US 10,715,490 B2
(45) Date of Patent: Jul. 14, 2020

(54) FIREWALL CLUSTER

(71) Applicant: NEW H3C TECHNOLOGIES CO., LTD, Hangzhou, Zhejiang (CN)

(72) Inventors: Dong Xie, Beijing (CN); Shufa Guan, Beijing (CN)

(73) Assignee: NEW H3C TECHNOLOGIES CO., LTD, Hangzhou (CN)

(*) Notice: Subject to any disclaimer, the term of this patent is extended or adjusted under 35 U.S.C. 154(b) by 89 days.

(21) Appl. No.: 15/768,454

(22) PCT Filed: Oct. 28, 2016

(86) PCT No.: PCT/CN2016/103665
§ 371 (c)(1),
(2) Date: Apr. 13, 2018

(87) PCT Pub. No.: WO2017/071624
PCT Pub. Date: May 4, 2017

(65) Prior Publication Data
US 2018/0302371 A1   Oct. 18, 2018

(30) Foreign Application Priority Data
Oct. 28, 2015  (CN) .......................... 2015 1 0712149

(51) Int. Cl.
*H04L 29/06* (2006.01)
*H04L 29/08* (2006.01)
*H04L 12/46* (2006.01)
*H04L 12/26* (2006.01)

(52) U.S. Cl.
CPC ...... *H04L 63/0209* (2013.01); *H04L 12/4641* (2013.01); *H04L 29/08* (2013.01); *H04L 43/0876* (2013.01); *H04L 67/1002* (2013.01)

(58) Field of Classification Search
None
See application file for complete search history.

(56) References Cited

U.S. PATENT DOCUMENTS

| 9,088,584 | B2* | 7/2015 | Feng | .................. G06F 11/16 |
| 9,275,004 | B2* | 3/2016 | Zhu | .................. G06F 9/45558 |
| 9,807,016 | B1* | 10/2017 | Sarangapani | .......... H04L 47/125 |
| 10,333,827 | B2* | 6/2019 | Xu | .......................... H04L 45/14 |

(Continued)

FOREIGN PATENT DOCUMENTS

| CN | 103491129 A | 1/2014 |
| CN | 104378299 A | 2/2015 |

(Continued)

Primary Examiner — Taghi T Arani
Assistant Examiner — Joshua R White
(74) Attorney, Agent, or Firm — McCarter & English, LLP; Kia L. Freeman; Thomas F. Foley

(57) ABSTRACT

A Software Defined Network (SDN) controller monitors load of Virtual FireWall (vFW) nodes in a firewall cluster in real time. When detecting that load of one or more vFW nodes is higher than a predefined first threshold, the SDN controller creates a new vFW node. The SDN controller selects a first flow, which is to be migrated, from flows passing through the monitored vFW nodes, updates a first flow entry corresponding to the first flow, and sends the updated first flow entry to a switch. The updated first flow entry indicates the switch to send the first flow to the new vFW node.

10 Claims, 8 Drawing Sheets

---

101 — a SDN controller monitors load of Virtual FireWall (vFW) nodes in a firewall cluster in real time. The firewall cluster includes the SDN controller, one or more vFW nodes and a switch. The vFW nodes are equivalent next hops of the switch 102 — when detecting that load of one or more vFW nodes is higher than a predefined first threshold, the SDN controller creates a new vFW node 103 — the SDN controller selects a first flow, which is to be migrated, from flows passing through the monitored vFW nodes, updates a first flow entry corresponding to the first flow, and sends the updated first flow entry to the switch. The updated first flow entry may indicate the switch to send the first flow to the new vFW node

(56) References Cited

U.S. PATENT DOCUMENTS

| | | |
|---|---|---|
| 2012/0210416 A1 | 8/2012 | Mihelich et al. |
| 2013/0028091 A1* | 1/2013 | Sun .................... H04L 41/0896 370/236 |
| 2016/0048407 A1* | 2/2016 | Alicherry ............ H04L 41/5096 718/1 |
| 2016/0094449 A1* | 3/2016 | Ramia ................... H04L 45/745 370/392 |
| 2016/0134472 A1 | 5/2016 | Guan et al. |
| 2016/0328258 A1 | 11/2016 | Iwashina et al. |
| 2017/0019373 A1* | 1/2017 | Meng .................... H04L 61/256 |
| 2018/0006952 A1* | 1/2018 | Nakakura ............... G06F 9/505 |

FOREIGN PATENT DOCUMENTS

| | | | |
|---|---|---|---|
| CN | 104468353 A | | 3/2015 |
| CN | 104468353 A | | 3/2015 |
| JP | 2011159247 | * | 8/2011 |
| JP | 2011159247 A | | 8/2011 |
| JP | 201237935 A | | 2/2012 |
| JP | 2013179456 A | | 9/2013 |
| WO | 2014091431 A1 | | 6/2014 |
| WO | 2015099036 A1 | | 7/2015 |

* cited by examiner

101 — a SDN controller monitors load of Virtual FireWall (vFW) nodes in a firewall cluster in real time. The firewall cluster includes the SDN controller, one or more vFW nodes and a switch. The vFW nodes are equivalent next hops of the switch 102 — when detecting that load of one or more vFW nodes is higher than a predefined first threshold, the SDN controller creates a new vFW node 103 — the SDN controller selects a first flow, which is to be migrated, from flows passing through the monitored vFW nodes, updates a first flow entry corresponding to the first flow, and sends the updated first flow entry to the switch. The updated first flow entry may indicate the switch to send the first flow to the new vFW node

FIG. 1

201 — a SDN Controller is set in a network where a firewall cluster is located, and the SDN Controller enables functions of a Flow Manager and functions of a NFV Manager 202 — by a NFV technology, the NFV Manager creates multiple vFW nodes according to performance of the firewall cluster. An uplink port and a downlink port of each vFW node are bundled with the switch. The multiple vFW nodes are equivalent next hops of the switch, and the switch enables functions of a SDN network device

FIG. 2

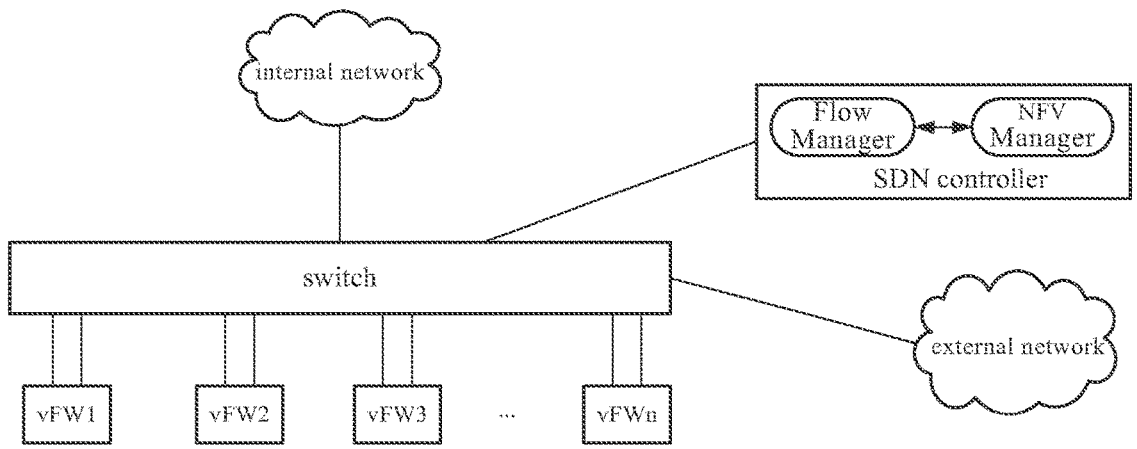

FIG. 3

| each of vFW nodes in a firewall cluster sends its uplink and downlink routing to a switch by an Equal-Cost Multi-Path routing (ECMP) technology, and the switch receives the uplink and downlink routing sent by each vFW node, and sends to a SDN controller the information that the vFW nodes are equivalent next hops on the uplink and downlink directions of the switch | 400 |

↓

| the switch receives a flow packet from an internal network, wherein a source IP address of the flow packet is IP_A and a destination IP address of the flow packet is IP_B. Theswitch searches for a flow entry locally according to the destination IP address of the flow packet, and if the flow entry is not found, encapsulates the flow packet into a Packet in packet and sends the Packet in packet to the SDN Controller | 401 |

↓

| the SDN Controller receives the Packet in packet. When finding that the source address of the Packet in packet is the address of the switch and determining that the switch has equivalent next hops according to the locally recorded information about that the vFW nodes in the firewall cluster are equivalent next hops on the uplink and downlink directions of the switch, the SDN Controller parses out the flow packet from the Packet in packet, performs a HASH operation for IP_A, IP_B and the number of the vFW nodes in the firewall cluster according to a predefined HASH algorithm, and maps a HASH operation result to a vFW node in the firewall cluster. The SDN Controller determines the vFW node as a next hop forwarding the flow packet, generates a flow entry for the flow packet, encapsulates the flow entry into a Packet out packet and sends the Packet out packet to the switch | 402 |

↓

| the switch receives the Packet out packet, parses out the flow entry sent by the SDN Controller from the Packet out packet, stores the flow entry, and according to a next hop in the flow entry, sends the flow packet to a vFW node corresponding to next hop | 403 |

↓

| the vFW node receives the flow packet, performs firewall service processing for the flow packet, generates session information corresponding to the flow packet, and when the flow packet is not filtered out, returns the flow packet to the switch | 404 |

↓

| the switch receives the flow packet returned by the vFW node, and forwards the flow packet to an external network | 405 |

FIG. 4

FIREWALL CLUSTER

RELATED APPLICATIONS

This application is a 35 U.S.C. § 371 national stage filing of International Application No. PCT/CN2016/103665, filed on Oct. 28, 2016, which claims priority of Chinese Patent Application No. 201510712149.7, filed on Oct. 28, 2015. The entire contents of each of the foregoing applications are incorporated herein by reference.

BACKGROUND

A Software Defined Network (SDN) is a new network structure. The core technology of the SDN is OpenFlow, which can implement flexible management of network flows by separating the control plane of a network device from the data plane of the network device.

A SDN controller may implement functions including the collection of network topology, the calculation of routing, the generation and distribution of flowentries, the management and control of a network. A network layer device may perform the forwarding of flows and the execution of policies.

Network Functions Virtualization (NFV) is an Industry Specification Group (ISG) of European Telecommunication Standards Institute (ETSI). In a NFV method, all kinds of network elements become separated applications, and may be deployed flexibly on a platform that is constructed based on standard servers, storages and switches.

NFV technology is based on cloud calculation and virtualization technology. A universal Commercial Off-The-Shelf (COTS) calculation/storage/network hardware device may be divided into many kinds of resources by the virtualization technology, so as to be used by various applications in an upper layer. Further, the applications may be decoupled from hardware, thereby greatly improving the supply speed of resources.

By a firewall stack technology, multiple physical firewall devices may be stacked to form a logic firewall device.

BRIEF DESCRIPTION OF THE DRAWINGS

FIG. 1 is a flowchart illustrating a method for implementing a firewall cluster according to some examples of the present disclosure.

FIG. 2 is a flowchart illustrating a method for deploying a firewall cluster according to some examples of the present disclosure.

FIG. 3 is a diagram illustrating a firewall cluster according to some examples of the present disclosure.

FIG. 4 is a flowchart illustrating a method for forwarding a flow packet from an internal network to an external network when implementing a firewall without a NAT service and a VPN service according to some examples of the present disclosure.

DETAILED DESCRIPTION

Figure 5:
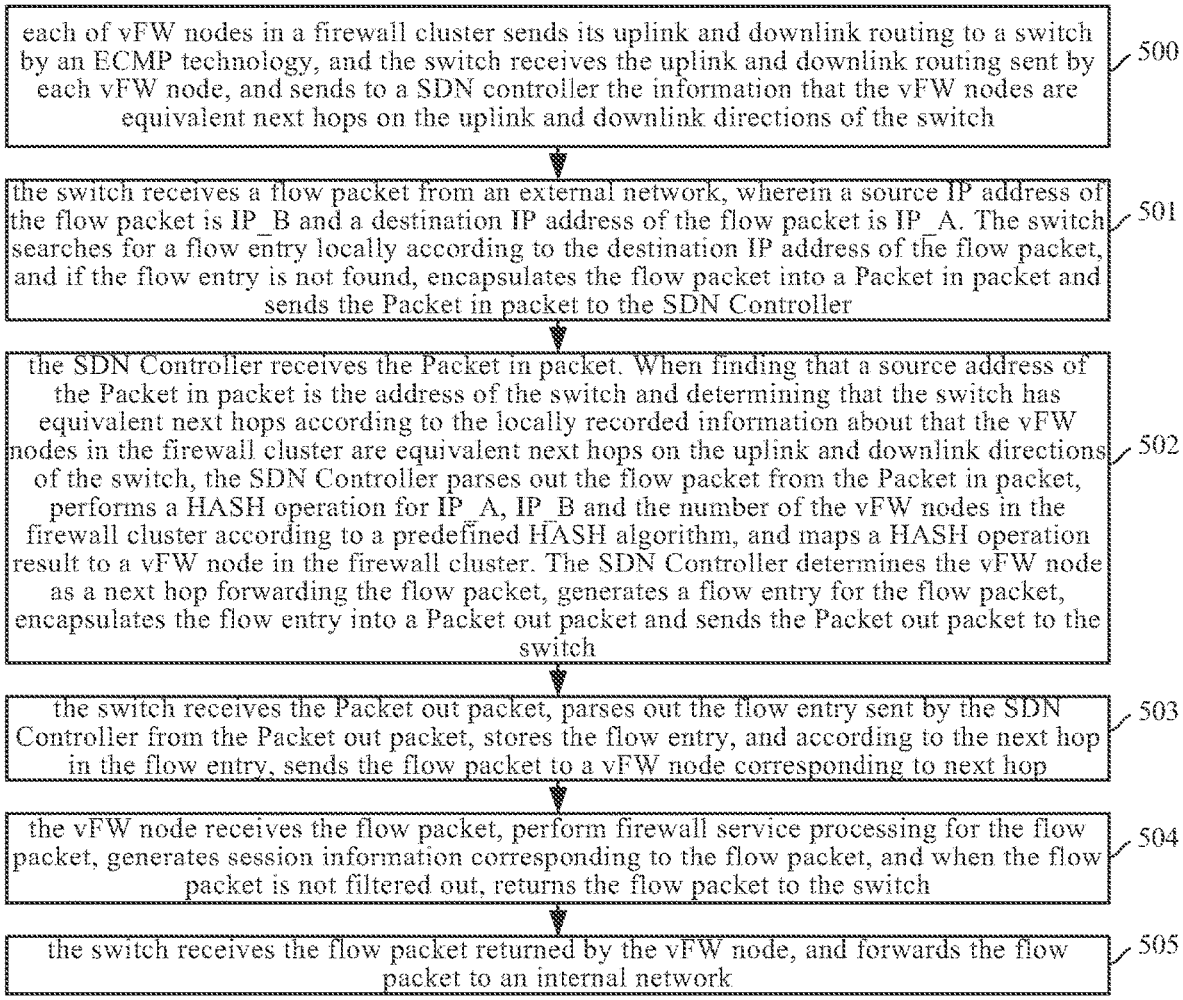
FIG. 5 is a flowchart illustrating a method for forwarding a flow packet from an external network to an internal network when implementing a firewall without a NAT service and a VPN service according to some examples of the present disclosure.

When multiple physical firewall devices are stacked by stack technology to form a logic firewall device, the number of physical firewall devices and a machine room in which these physical firewall devices may be laid should be considered in advance. When a stack member is added or deleted, configuration of stack ports should be modified, for example, add or delete the configuration of stack ports.

Examples of the present disclosure will be illustrated with reference to the accompanying drawings.

FIG. 1 is a flowchart illustrating a method for implementing a firewall cluster according to some examples of the present disclosure. As shown in FIG. 1, the method includes following blocks.

Block 101, a SDN controller monitors load of Virtual FireWall (vFW) nodes in a firewall cluster in real time. The firewall cluster includes the SDN controller, one or more vFW nodes and a switch. The vFW nodes are equivalent next hops of the switch.

At block 102, when detecting that load of one or more vFW nodes is higher than a predefined first threshold, the SDN controller creates a new vFW node.

At block 103, the SDN controller selects a first flow, which is to be migrated, from flows passing through the monitored vFW nodes, updates a first flow entry corresponding to the first flow, and sends the updated first flow entry to the switch. The updated first flow entry may indicate the switch to send the first flow to the new vFW node.

In some examples of the present disclosure, before updating the first flow entry corresponding to the first flow, the method further includes that:

the SDN controller sends an identity of the first flow and an identity of the new vFW node to the monitored vFW nodes; and the SDN controller receives a first notification message sent by a vFW node through which the first flow passes, wherein the first notification message is sent after the vFW node through which the first flow passes synchronizes session information corresponding to the first flow to the new vFW node.

In some examples of the present disclosure, the updating the first flow entry corresponding to the first flow includes:

changing a next hop in the first flow entry into the new vFW node.

In some examples of the present disclosure, after the SDN controller monitors the load of the vFW nodes in the firewall cluster in real time, the method further includes that:

when detecting that load of one or more vFW nodes is lower than a predefined second threshold, the SDN controller selects a to-be-removed vFW node from the one or more vFW nodes of which load is lower than the predefined second threshold, determines a second flow passing through the to-be-removed vFW node as a to-be-migrated flow, and determines a destination vFW node to which the second flow is to be migrated; and the SDN controller updates a second flow entry corresponding to the second flow, and sends the updated second flow entry to the switch, wherein the updated second flow entry may indicate the switch to send the second flow to the destination vFW node.

In some examples of the present disclosure, before updating the second flow entry corresponding to the second flow, the method further includes that:

the SDN controller sends an identity of the second flow and an identity of the destination vFW node to the to-be-removed vFW node; and the SDN controller receives a second notification message sent by the to-be-removed vFW node, wherein the second notification message is sent after the to-be-removed vFW node synchronizes session information corresponding to the second flow to the destination vFW node.

In some examples of the present disclosure, the updating the second flow entry corresponding to the second flow includes:

changing a next hop in the second flow entry into the destination vFW node.

In some examples of the present disclosure, when the vFW nodes in the firewall cluster do not have a Network Address Translation (NAT) service and a Virtual Private Network (VPN) service, the method further includes that:

when receiving a flow packet sent by the switch, the SDN controller selects a vFW node from the vFW nodes according to a HASH algorithm and notifies the switch of the selected vFW node, so that the switch forwards the flow packet to the selected vFW node.

In some examples of the present disclosure, when the vFW nodes in the firewall cluster have a NAT service and a VPN service, the method further includes that:

the SDN controller assigns NAT addresses in a NAT address pool to the vFW nodes; and when receiving a flow packet sent by the switch, the SDN controller parses out a VPN packet from the flow packet, searches for a vFW node corresponding to a destination address of the VPN packet, generates a flow entry and sends the generated flow entry to the switch, wherein the destination address of the VPN packet is a NAT address and the generated flow entry may indicate the switch to forward the VPN packet to the searched-out vFW node.

FIG. 2 is a flowchart illustrating a method for deploying a firewall cluster according to some examples of the present disclosure. As shown in FIG. 2, the method includes following blocks.

At block 201, a SDN Controller is set in a network where a firewall cluster is located, and the SDN Controller enables functions of a Flow Manager and functions of a NFV Manager.

At block 202, by NFV technology, the NFV Manager creates multiple vFW nodes according to performance of the firewall cluster. An uplink port and a downlink port of each vFW node are bundled with the switch. The multiple vFW nodes are equivalent next hops of the switch, and the switch enables functions of a SDN network device. The functions of the SDN network device include an OpenFlow forwarding function.

In some examples of the present disclosure, the number of the vFW nodes may be determined according to the performance of the firewall cluster.

FIG. 3 is a diagram illustrating a firewall cluster according to some examples of the present disclosure. As shown in FIG. 3, the firewall cluster includes a SDN controller, n vFW nodes and a switch, wherein n is a positive integer. The switch is connected with an internal network and an external network respectively, and the n vFW nodes are equivalent next hops of the switch. The SDN controller enables functions of a flow manager and functions of a NFV manager.

In some examples of the present disclosure, according to services provided by the firewall cluster, firewalls in the firewall cluster may be divided into two types.

A first type of firewall is a firewall without a NAT service and a VPN service.

The firewall without a NAT service and a VPN service may process such services as firewall attack and precaution, inter-domain policies and so on, and the switch may forward bidirectional packets of the same flow to the same vFW node.

A second type of firewall is a firewall with a NAT service and a VPN service.

The firewall with a NAT service and a VPN service may divide NAT services and VPN services to assign them to vFW nodes.

FIG. 4 is a flowchart illustrating a method for forwarding a flow packet from an internal network to an external network when implementing a firewall without a NAT service and a VPN service according to some examples of the present disclosure. As shown in FIG. 4, the method includes following blocks.

At block 400, each of vFW nodes in a firewall cluster sends its uplink and downlink routing to a switch by an Equal-Cost Multi-Path routing (ECMP) technology, and the switch receives the uplink and downlink routing sent by each vFW node, and sends to a SDN controller the information that the vFW nodes are equivalent next hops on the uplink and downlink directions of the switch.

Regardless of a flow on the uplink direction or a flow on the downlink direction, the switch sends the flow to the firewall cluster first. The vFW nodes in the firewall cluster are equivalent next hops on the uplink and downlink direction of the switch.

At block 401, the switch receives a flow packet from an internal network, wherein a source IP address of the flow packet is IP_A and a destination IP address of the flow packet is IP_B. The switch searches for a flow entry locally according to the destination IP address of the flow packet, and if the flow entry is not found, encapsulates the flow packet into a Packet in packet and sends the Packet in packet to the SDN Controller.

A source address of the Packet in packet is the address of the switch, and the destination address of the Packet in packet is the address of the SDN Controller.

At block 402, the SDN Controller receives the Packet in packet. When finding that the source address of the Packet in packet is the address of the switch and determining that the switch has equivalent next hops according to the locally recorded information about that the vFW nodes in the firewall cluster are equivalent next hops on the uplink and downlink directions of the switch, the SDN Controller parses out the flow packet from the Packet in packet, performs a HASH operation for IP_A, IP_B and the number of the vFW nodes in the firewall cluster according to a predefined HASH algorithm, and maps a HASH operation result to a vFW node in the firewall cluster. The SDN Controller determines the vFW node as a next hop forwarding the flow packet, generates a flow entry for the flow packet, encapsulates the flow entry into a Packet out packet and sends the Packet out packet to the switch.

In some examples of the present disclosure, two key parameters IP_A and IP_B are filled orderly in the HASH algorithm.

Contents of the flow entry include the destination IP address (i.e., IP_B) of the flow packet and information of the next hop.

At block 403, the switch receives the Packet out packet, parses out the flow entry sent by the SDN Controller from the Packet out packet, stores the flow entry, and according to a next hop in the flow entry, sends the flow packet to a vFW node corresponding to next hop.

At block 404, the vFW node receives the flow packet, performs firewall service processing for the flow packet, generates session information corresponding to the flow packet, and when the flow packet is not filtered out, returns the flow packet to the switch.

The session information includes the source IP address, a source IP port number, the destination IP address, a destination IP port number, a protocol number and status of the flow packet.

At block 405, the switch receives the flow packet returned by the vFW node, and forwards the flow packet to an external network.

FIG. 5 is a flowchart illustrating a method for forwarding a flow packet from an external network to an internal network when implementing a firewall without a NAT service and a VPN service according to some examples of the present disclosure. As shown in FIG. 5, the method includes following blocks.

At block 500, each of vFW nodes in a firewall cluster sends its uplink and downlink routing to a switch by an ECMP technology, and the switch receives the uplink and downlink routing sent by each vFW node, and sends to a SDN controller the information that the vFW nodes are equivalent next hops on the uplink and downlink directions of the switch.

At block 501, the switch receives a flow packet from an external network, wherein a source IP address of the flow packet is IP_B and a destination IP address of the flow packet is IP_A. The switch searches for a flow entry locally according to the destination IP address of the flow packet, and if the flow entry is not found, encapsulates the flow packet into a Packet in packet and sends the Packet in packet to the SDN Controller.

At block 502, the SDN Controller receives the Packet in packet. When finding that a source address of the Packet in packet is the address of the switch and determining that the switch has equivalent next hops according to the locally recorded information about that the vFW nodes in the firewall cluster are equivalent next hops on the uplink and downlink directions of the switch, the SDN Controller parses out the flow packet from the Packet in packet, performs a HASH operation for IP_A, IP_B and the number of the vFW nodes in the firewall cluster according to a predefined HASH algorithm, and maps a HASH operation result to a vFW node in the firewall cluster. The SDN Controller determines the vFW node as a next hop forwarding the flow packet, generates a flow entry for the flow packet, encapsulates the flow entry into a Packet out packet and sends the Packet out packet to the switch.

In some examples of the present disclosure, two key parameters IP_A and IP_B are filled orderly in the HASH algorithm.

The HASH operation at block 502 is the same as the HASH operation at block 402, and thus the HASH operation result at block 502 is the same as the HASH operation result at block 402, thereby ensuring that the bidirectional packets of the same flow can be forwarded to the same vFW node.

At block 503, the switch receives the Packet out packet, parses out the flow entry sent by the SDN Controller from the Packet out packet, stores the flow entry, and according to the next hop in the flow entry, sends the flow packet to a vFW node corresponding to next hop.

At block 504, the vFW node receives the flow packet, perform firewall service processing for the flow packet, generates session information corresponding to the flow packet, and when the flow packet is not filtered out, returns the flow packet to the switch.

At block 505, the switch receives the flow packet returned by the vFW node, and forwards the flow packet to an internal network.

Figure 6:
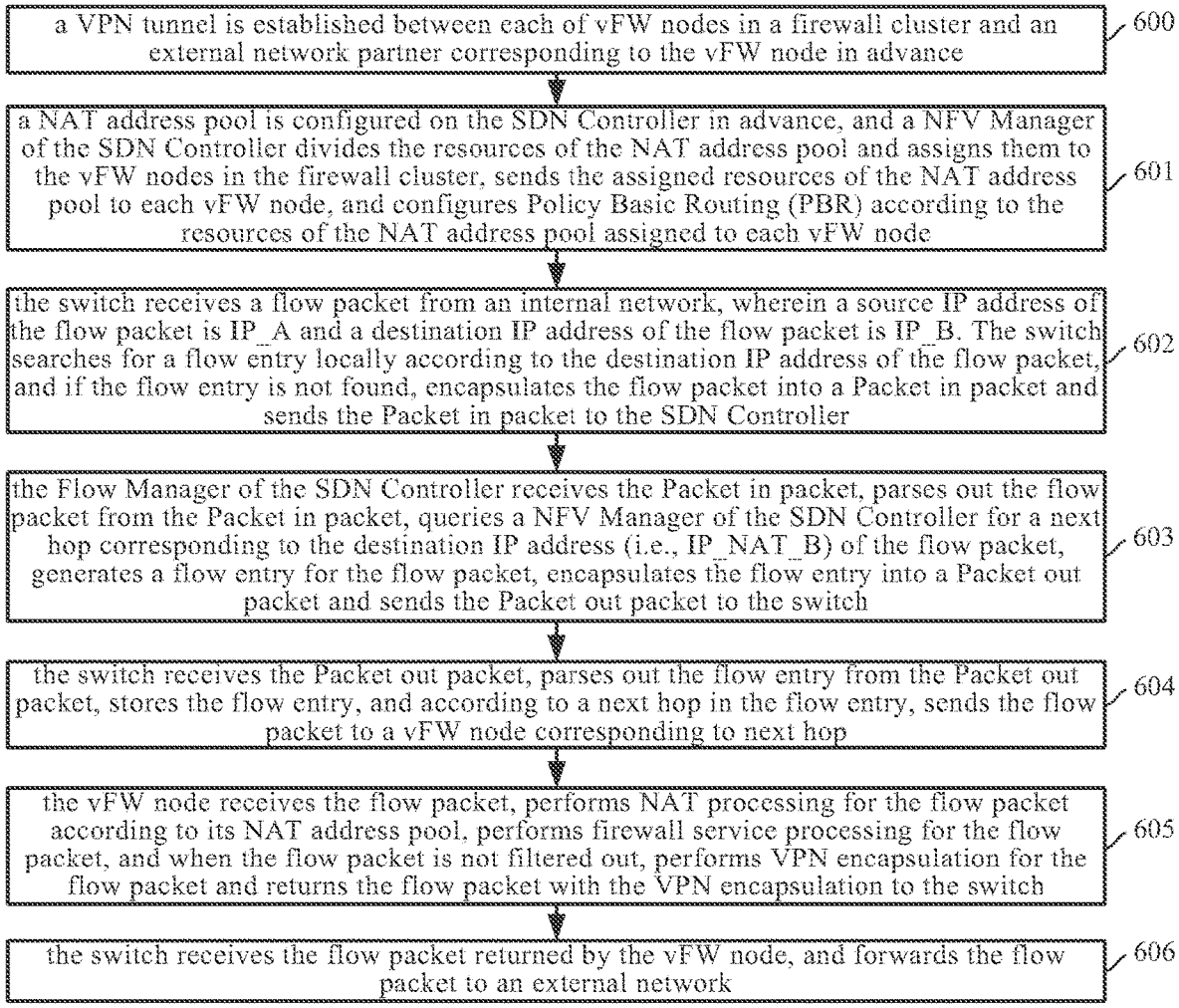
FIG. 6 is a flowchart illustrating a method for forwarding a flow packet from an internal network to an external network when implementing a firewall with a NAT service and a VPN service according to some examples of the present disclosure.

FIG. 6 is a flowchart illustrating a method for forwarding a flow packet from an internal network to an external network when implementing a firewall with a NAT service and a VPN service according to some examples of the present disclosure. As shown in FIG. 6, the method includes following blocks.

At block 600, a VPN tunnel is established between each of vFW nodes in a firewall cluster and an external network partner corresponding to the vFW node in advance.

One partner refers to one VPN in the external network.

Each vFW node may establish a VPN tunnel with one or more partners. Usually, the higher the performance of a vFW node is, the larger the number of established VPN tunnels is. One partner can establish a VPN tunnel with one vFW node.

At block 601, a NAT address pool is configured on the SDN Controller in advance, and a NFV Manager of the SDN Controller divides the resources of the NAT address pool and assigns them to the vFW nodes in the firewall cluster, sends the assigned resources of the NAT address pool to each vFW node, and configures Policy Basic Routing (PBR) according to the resources of the NAT address pool assigned to each vFW node.

The resources of the NAT address pool may be divided and assigned according to the performance of each vFW node. The higher the performance of a vFW node is, the more the NAT addresses in the NAT address pool assigned to the vFW node are.

The PBR includes a NAT address and information of a next hop corresponding to the NAT address. The next hop corresponding to the NAT address is a vFW node to which the NAT address is assigned.

At block 602, the switch receives a flow packet from an internal network, wherein a source IP address of the flow packet is IP_A and a destination IP address of the flow packet is IP_B. The switch searches for a flow entry locally according to the destination IP address of the flow packet, and if the flow entry is not found, encapsulates the flow packet into a Packet in packet and sends the Packet in packet to the SDN Controller.

IP_NAT_B is an address obtained after performing NAT for IP_B.

At block 603, the Flow Manager of the SDN Controller receives the Packet in packet, parses out the flow packet from the Packet in packet, queries a NFV Manager of the SDN Controller for a next hop corresponding to the destination IP address (i.e., IP_NAT_B) of the flow packet, generates a flow entry for the flow packet, encapsulates the flow entry into a Packet out packet and sends the Packet out packet to the switch.

When the Flow Manager queries the NFV Manager for the next hop corresponding to the destination IP address (i.e., IP_NAT_B) of the flow packet, the NFV Manager finds the next hop corresponding to IP_NAT_B in the locally configured PBR. The next hop points to a vFW node.

At block 604, the switch receives the Packet out packet, parses out the flow entry from the Packet out packet, stores the flow entry, and according to a next hop in the flow entry, sends the flow packet to a vFW node corresponding to next hop.

At block 605, the vFW node receives the flow packet, performs NAT processing for the flow packet according to its NAT address pool, performs firewall service processing for the flow packet, and when the flow packet is not filtered out, performs VPN encapsulation for the flow packet and returns the flow packet with the VPN encapsulation to the switch.

At block 606, the switch receives the flow packet returned by the vFW node, and forwards the flow packet to an external network.

Figure 7:
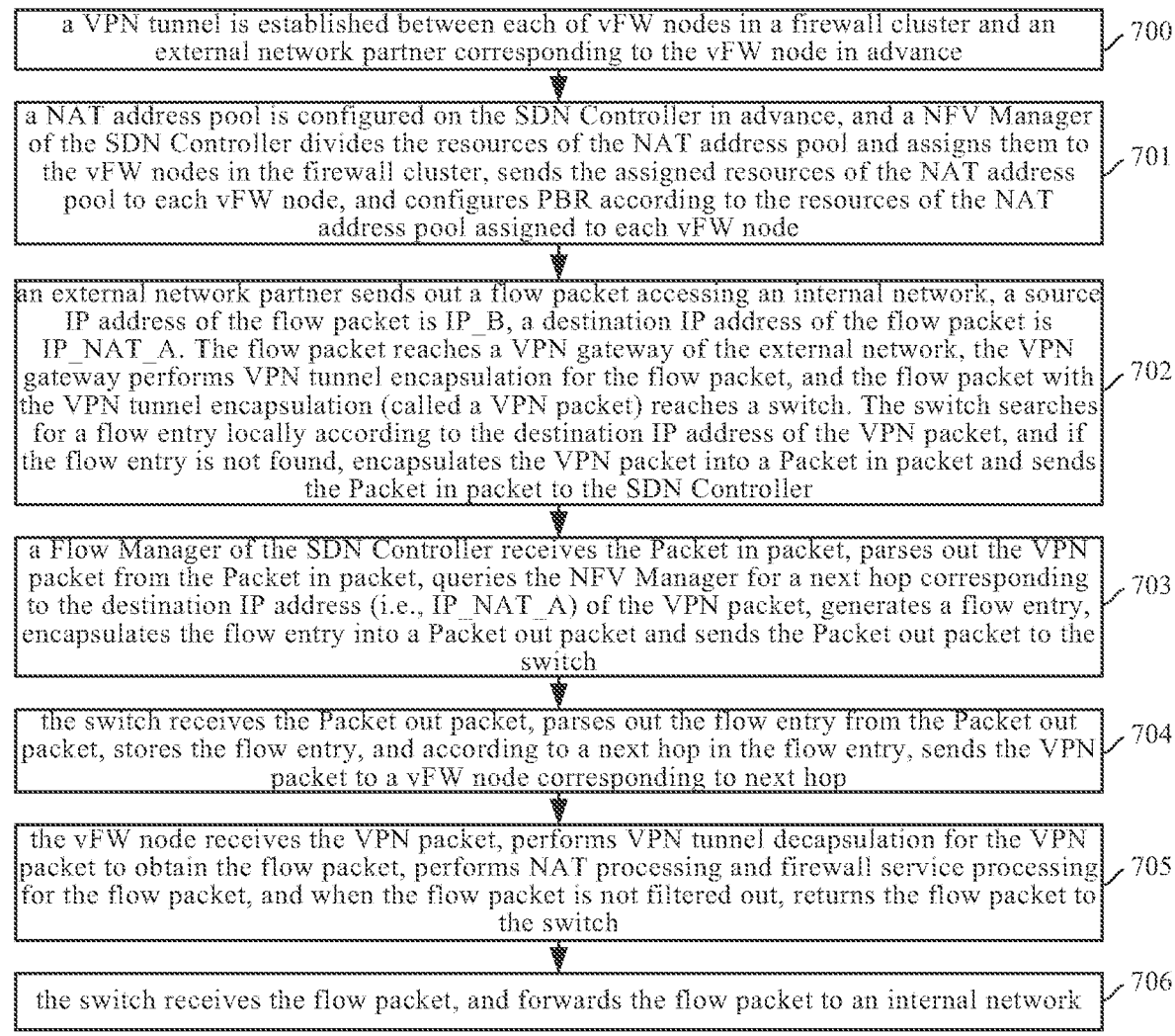
FIG. 7 is a flowchart illustrating a method for forwarding a flow packet from an external network to an internal network when implementing a firewall with a NAT service and a VPN service according to some examples of the present disclosure.

FIG. 7 is a flowchart illustrating a method for forwarding a flow packet from an external network to an internal network when implementing a firewall with a NAT service and a VPN service according to some examples of the present disclosure. As shown in FIG. 7, the method includes following blocks.

At block 700, a VPN tunnel is established between each of vFW nodes in a firewall cluster and an external network partner corresponding to the vFW node in advance.

One partner refers to one VPN in the external network.

Each vFW node may establish a VPN tunnel with one or more partners. Usually, the higher the performance of a vFW node is, the larger the number of established VPN tunnels is. One partner can establish a VPN tunnel with one vFW node.

At block 701, a NAT address pool is configured on the SDN Controller in advance, and a NFV Manager of the SDN Controller divides the resources of the NAT address pool and assigns them to the vFW nodes in the firewall cluster, sends the assigned resources of the NAT address pool to each vFW node, and configures PBR according to the resources of the NAT address pool assigned to each vFW node.

The resources of the NAT address pool may be divided and assigned according to the performance of each vFW node. The higher the performance of a vFW node is, the more the NAT addresses in the NAT address pool assigned to the vFW node are.

The PBR includes a NAT address and information of a next hop corresponding to the NAT address. The next hop corresponding to the NAT address is a vFW node to which the NAT address is assigned.

At block 702, an external network partner sends out a flow packet accessing an internal network, a source IP address of the flow packet is IP_B, a destination IP address of the flow packet is IP_NAT_A. The flow packet reaches a VPN gateway of the external network, the VPN gateway performs VPN tunnel encapsulation for the flow packet, and the flow packet with the VPN tunnel encapsulation (called a VPN packet) reaches a switch. The switch searches for a flow entry locally according to the destination IP address of the VPN packet, and if the flow entry is not found, encapsulates the VPN packet into a Packet in packet and sends the Packet in packet to the SDN Controller.

IP_NAT_A is a NAT address, which is an IP address obtained after performing NAT for IP_A.

At block 703, a Flow Manager of the SDN Controller receives the Packet in packet, parses out the VPN packet from the Packet in packet, queries the NFV Manager for a next hop corresponding to the destination IP address (i.e., IP_NAT_A) of the VPN packet, generates a flow entry, encapsulates the flow entry into a Packet out packet and sends the Packet out packet to the switch.

At block 704, the switch receives the Packet out packet, parses out the flow entry from the Packet out packet, stores the flow entry, and according to a next hop in the flow entry, sends the VPN packet to a vFW node corresponding to next hop.

At block 705, the vFW node receives the VPN packet, performs VPN tunnel decapsulation for the VPN packet to obtain the flow packet, performs NAT processing and firewall service processing for the flow packet, and when the flow packet is not filtered out, returns the flow packet to the switch.

At block 706, the switch receives the flow packet, and forwards the flow packet to an internal network.

Figure 8:
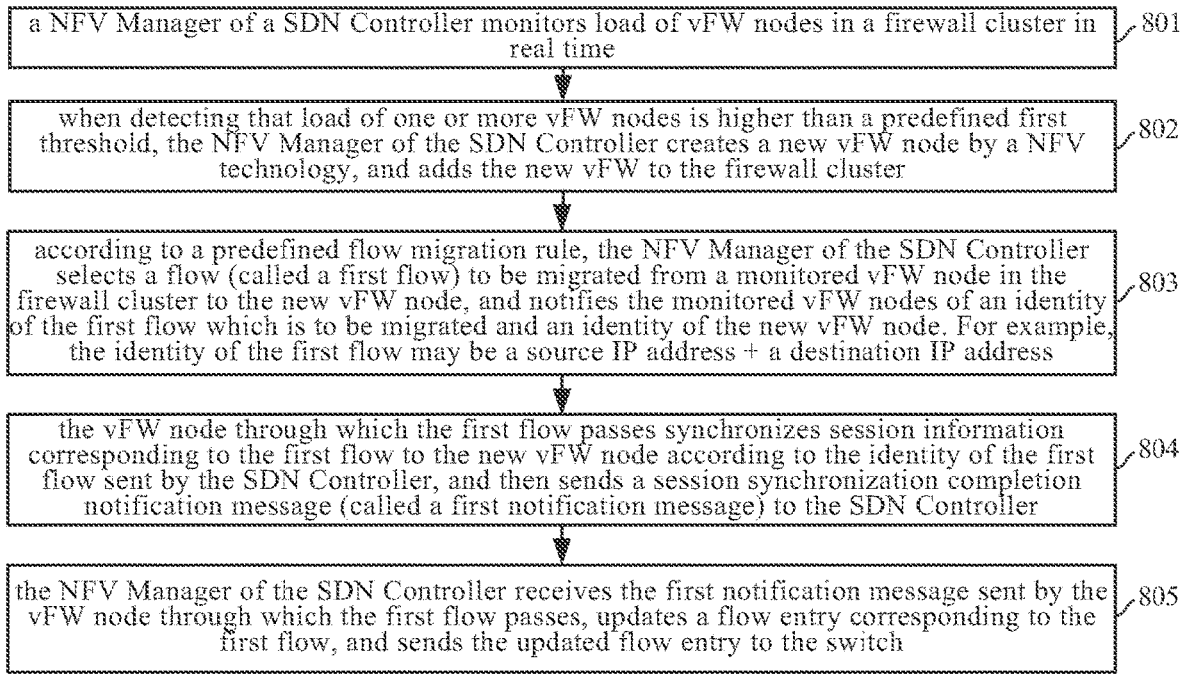
FIG. 8 is a flowchart illustrating a method for expanding a firewall cluster when implementing a firewall without a NAT service and a VPN service according to some examples of the present disclosure.

FIG. 8 is a flowchart illustrating a method for expanding a firewall cluster when implementing a firewall without a NAT service and a VPN service according to some examples of the present disclosure. As shown in FIG. 8, the method includes following blocks.

At block 801, a NFV Manager of a SDN Controller monitors load of vFW nodes in a firewall cluster in real time.

In some examples of the present disclosure, the NFV Manager of the SDN Controller may monitor the load of the vFW nodes through monitoring any one or combination of CPU, memory, bandwidth and the number of connections of the vFW nodes.

At block 802, when detecting that load of one or more vFW nodes is higher than a predefined first threshold, the NFV Manager of the SDN Controller creates a new vFW node by a NFV technology, and adds the new vFW to the firewall cluster.

At block 803, according to a predefined flow migration rule, the NFV Manager of the SDN Controller selects a flow (called a first flow) to be migrated from a monitored vFW node in the firewall cluster to the new vFW node, and notifies the monitored vFW nodes of an identity of the first flow which is to be migrated and an identity of the new vFW node. For example, the identity of the first flow may be a source IP address+a destination IP address.

In some examples of the present disclosure, the to-be-migrated flow may be selected from flows passing through the monitored vFW nodes according to a predefined HASH algorithm.

At block 804, the vFW node through which the first flow passes synchronizes session information corresponding to the first flow to the new vFW node according to the identity of the first flow sent by the SDN Controller, and then sends a session synchronization completion notification message (called a first notification message) to the SDN Controller.

At block 805, the NFV Manager of the SDN Controller receives the first notification message sent by the vFW node through which the first flow passes, updates a flow entry corresponding to the first flow, and sends the updated flow entry to the switch.

In some examples of the present disclosure, a process of updating the flow entry corresponding to the first flow includes changing a next hop in the flow entry corresponding to the first flow into the new vFW node. Accordingly, when receiving the first flow, the switch may send the first flow to the new vFW node.

Figure 9:
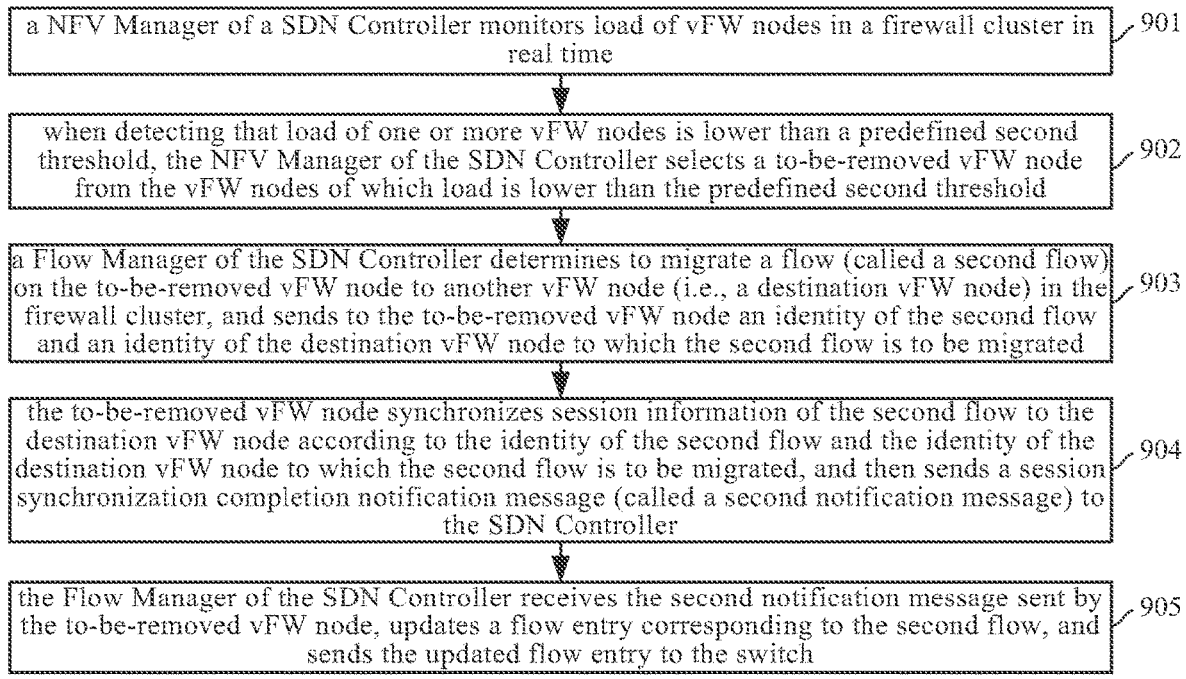
FIG. 9 is a flowchart illustrating a method for reducing a firewall cluster when implementing a firewall without a NAT service and a VPN service according to some examples of the present disclosure.

FIG. 9 is a flowchart illustrating a method for reducing a firewall cluster when implementing a firewall without a NAT service and a VPN service according to some examples of the present disclosure. As shown in FIG. 9, the method includes following blocks.

At block 901, a NFV Manager of a SDN Controller monitors load of vFW nodes in a firewall cluster in real time.

In some examples of the present disclosure, the NFV Manager of the SDN Controller may monitor the load of the vFW nodes through monitoring any one or combination of CPU, memory, bandwidth and the number of connections of the vFW nodes.

At block 902, when detecting that load of one or more vFW nodes is lower than a predefined second threshold, the NFV Manager of the SDN Controller selects a to-be-removed vFW node from the vFW nodes of which load is lower than the predefined second threshold.

Usually, a vFW node of which load is the lowest is determined as the to-be-removed vFW node.

At block 903, a Flow Manager of the SDN Controller determines to migrate a flow (called a second flow) on the to-be-removed vFW node to another vFW node (i.e., a destination vFW node) in the firewall cluster, and sends to the to-be-removed vFW node an identity of the second flow and an identity of the destination vFW node to which the second flow is to be migrated.

In some examples of the present disclosure, the destination vFW node may be selected from the vFW nodes in the firewall cluster except the to-be-removed vFW node according to a predefined HASH algorithm.

At block 904, the to-be-removed vFW node synchronizes session information of the second flow to the destination vFW node according to the identity of the second flow and the identity of the destination vFW node to which the second flow is to be migrated, and then sends a session synchronization completion notification message (called a second notification message) to the SDN Controller.

At block 905, the Flow Manager of the SDN Controller receives the second notification message sent by the to-be-removed vFW node, updates a flow entry corresponding to the second flow, and sends the updated flow entry to the switch.

In some examples of the present disclosure, a process of updating the flow entry corresponding to the second flow includes changing a next hop in the flow entry corresponding to the second flow into the destination vFW node to which the second flow is to be migrated.

In some examples of the present disclosure, the new vFW node is created according to a NFV technology, thereby implementing the automatic deployment of the firewall cluster. Through bundling the uplink and downlink ports of each vFW node with a SDN network device, vFW nodes can be taken as equivalent next hops on the uplink and downlink directions of the SDN network device, and thus the uplink and downlink packets can be evenly forwarded to the vFW nodes by the SDN network device.

In some examples of the present disclosure, a SDN controller monitors load of vFW nodes in a firewall cluster in real time. When detecting that load of one or more vFW nodes is higher than a predefined first threshold, the SDN controller creates a new vFW node and adds the new vFW node to the firewall cluster. The SDN controller selects a first flow, which is to be migrated, from flows passing through the monitored vFW nodes, and migrates the first flow to the new vFW node, thereby implementing the automatic expansion of the firewall cluster. When detecting that load of one or more vFW nodes is lower than a predefined second threshold, the SDN controller selects a to-be-removed vFW node from the firewall cluster, thereby implementing the automatic reducing of the firewall cluster.

Figure 10:
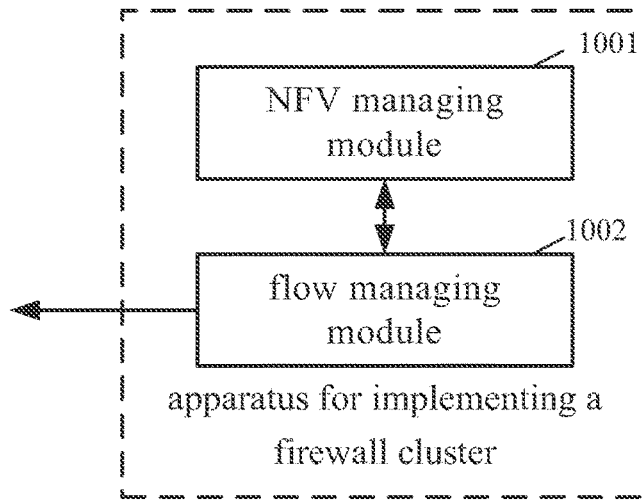
FIG. 10 is a diagram illustrating an apparatus for implementing a firewall cluster according to some examples of the present disclosure.

FIG. 10 is a diagram illustrating an apparatus for implementing a firewall cluster according to some examples of the present disclosure. The apparatus is located in a SDN Controller. The SDN Controller, one or more vFW nodes and a switch constructs a firewall cluster together. The vFW nodes in the firewall cluster are equivalent next hops of the switch. As shown in FIG. 10, the apparatus includes a NFV managing module 1001 and a flow managing module 1002.

The NFV managing module 1001 may monitor load of vFW nodes in a firewall cluster in real time, and when detecting that load of one or more vFW nodes is higher than a predefined first threshold, create a new vFW node.

After the NFV managing module 1001 creates the new vFW node, the flow managing module 1002 may select a first flow, which is to be migrated, from flows passing through the monitored vFW nodes, update a first flow entry corresponding to the first flow, and send the updated first flow entry to the switch. The updated first flow entry may indicate the switch to send the first flow to the new vFW node.

In some examples of the present disclosure, before updating the first flow entry corresponding to the first flow, the flow managing module 1002 may send an identity of the first flow and an identity of the new vFW node to the monitored vFW nodes; receive a first notification message sent by a vFW node through which the first flow passes. The first notification message is sent after the vFW node through which the first flow passes synchronizes session information corresponding to the first flow to the new vFW node.

In some examples of the present disclosure, when updating the first flow entry corresponding to the first flow, the flow managing module 1002 may change a next hop in the first flow entry into the new vFW node.

In some examples of the present disclosure, when detecting that load of one or more vFW nodes is lower than a predefined second threshold, the NFV managing module 1001 may select a to-be-removed vFW node from the one or more vFW nodes of which load is lower than the predefined second threshold.

After the NFV managing module 1001 selects the to-be-removed vFW node, the flow managing module 1002 may determine a second flow passing through the to-be-removed vFW node as a to-be-migrated flow, and determine a destination vFW node to which the second flow is to be migrated; update a second flow entry corresponding to the second flow, and send the updated second flow entry to the switch. The updated second flow entry may indicate the switch to send the second flow to the destination vFW node.

In some examples of the present disclosure, before updating the second flow entry corresponding to the second flow, the flow managing module 1002 may send an identity of the second flow and an identity of the destination vFW node to the to-be-removed vFW node; receive a second notification message sent by the to-be-removed vFW node. The second notification message is sent after the to-be-removed vFW node synchronizes session information corresponding to the second flow to the destination vFW node.

In some examples of the present disclosure, when updating the second flow entry corresponding to the second flow, the flow managing module 1002 may change a next hop in the second flow entry into the destination vFW node.

In some examples of the present disclosure, when the vFW nodes in the firewall cluster do not have a NAT service and a VPN service, the flow managing module 1002 may, when receiving a flow packet sent by the switch, select a vFW node from the vFW nodes according to a HASH algorithm and notify the switch of the selected vFW node, so that the switch forwards the flow packet to the selected vFW node.

In some examples of the present disclosure, when the vFW nodes have a NAT service and a VPN service, the NFV managing module 1001 may assign NAT addresses in a NAT address pool to the vFW nodes; and the flow managing module 1002 may, when receiving a flow packet sent by the switch, parse out a VPN packet from the flow packet, search for a vFW node corresponding to a destination address of the VPN packet, generate a flow entry and sends the generated flow entry to the switch. The destination address of the VPN packet is a NAT address and the generated flow entry may indicate the switch to forward the VPN packet to the searched-out vFW node.

Figure 11:
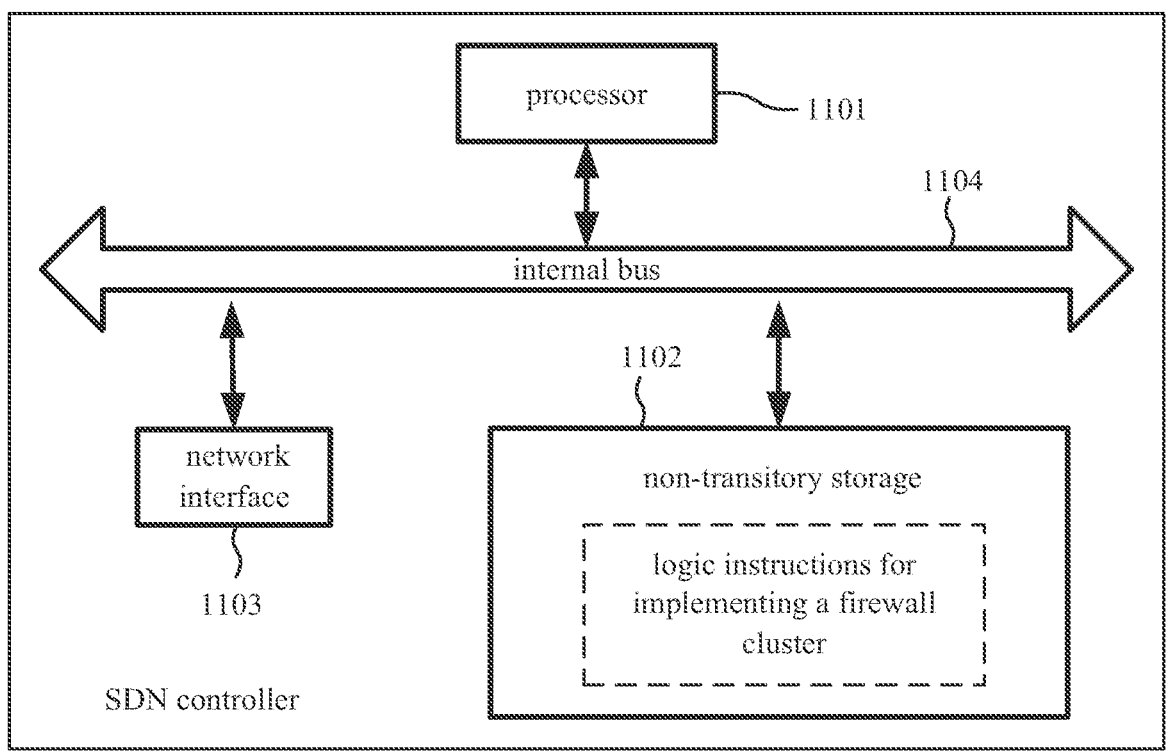
FIG. 11 is a diagram illustrating a hardware structure of a SDN controller according to some examples of the present disclosure.

A hardware structure of a SDN controller is provided according to some examples of the present disclosure. FIG. 11 is a diagram illustrating a hardware structure of a SDN controller according to some examples of the present disclosure.

The SDN Controller, one or more vFW nodes and a switch constructs a firewall cluster together. The vFW nodes in the firewall cluster are equivalent next hops of the switch. As shown in FIG. 11, the SDN controller includes a processor 1101, a non-transitory storage 1102, a network interface 1103 and an internal bus 1104. The non-transitory storage 1102 may be a non-transitory machine readable storage medium.

In some examples of the present disclosure, the non-transitory storage 1102 may store logic instructions for implementing a firewall cluster, and the logic instructions are machine readable instructions that can be executed by the processor 1101.

In some examples of the present disclosure, the machine readable instructions are executed by the processor 1101 to:

monitor load of Virtual FireWall (vFW) nodes in a firewall cluster in real time; when detecting that load of one or more vFW nodes is higher than a predefined first threshold, create a new vFW node; and select a first flow, which is to be migrated, from flows passing through the monitored vFW nodes, update a first flow entry corresponding to the first flow, and send the updated first flow entry to a switch, wherein the updated first flow entry indicates the switch to send the first flow to the new vFW node.

In some examples of the present disclosure, before updating the first flow entry corresponding to the first flow, the machine readable instructions further cause the processor 1101 to:

send an identity of the first flow and an identity of the new vFW node to the monitored vFW nodes; and receive a first notification message sent by a vFW node through which the first flow passes, wherein the first notification message is sent after the vFW node through which the first flow passes synchronizes session information corresponding to the first flow to the new vFW node.

In some examples of the present disclosure, in order to update the first flow entry corresponding to the first flow, the machine readable instructions further cause the processor 1101 to:

change a next hop in the first flow entry into the new vFW node.

In some examples of the present disclosure, when detecting that load of one or more vFW nodes is lower than a predefined second threshold, the machine readable instructions further cause the processor 1101 to:

select a to-be-removed vFW node from the one or more vFW nodes of which load is lower than the predefined second threshold; and determine a second flow passing through the to-be-removed vFW node as a to-be-migrated flow, and determine a destination vFW node to which the second flow is to be migrated; update a second flow entry corresponding to the second flow, and send the updated second flow entry to the switch, wherein the updated second flow entry indicates the switch to send the second flow to the destination vFW node.

In some examples of the present disclosure, before updating the second flow entry corresponding to the second flow, the machine readable instructions further cause the processor 1101 to:

send an identity of the second flow and an identity of the destination vFW node to the to-be-removed vFW node; and receive a second notification message sent by the to-be-removed vFW node, wherein the second notification message is sent after the to-be-removed vFW node synchronizes session information corresponding to the second flow to the destination vFW node.

In some examples of the present disclosure, in order to update the second flow entry corresponding to the second flow, the machine readable instructions further cause the processor 1101 to:

change a next hop in the second flow entry into the destination vFW node.

In some examples of the present disclosure, when the vFW node in the firewall cluster do not have a Network Address Translation (NAT) service and a Virtual Private Network (VPN) service, the machine readable instructions further cause the processor 1101 to:

when receiving a flow packet sent by the switch, select a vFW node from the vFW nodes according to a HASH algorithm and notify the switch of the selected vFW node, so that the switch forwards the flow packet to the selected vFW node.

In some examples of the present disclosure, when the vFW node in the firewall cluster have a NAT service and a VPN service, the machine readable instructions further cause the processor 1101 to:

when receiving a flow packet sent by the switch, parse out a VPN packet from the flow packet, search for a vFW node corresponding to a destination address of the VPN packet, generate a flow entry and send the generated flow entry to the switch, wherein the destination address of the VPN packet is a NAT address and the generated flow entry indicates the switch to forward the VPN packet to the searched-out vFW node.

In some examples of the present disclosure, the network interface 1103 is connected with other hardware devices, for example, the switch. The internal bus 1104 may connected with the processor 1101, the non-transitory storage 1102 and the network interface 1103.

The foregoing is only preferred examples of the present disclosure and is not used to limit the protection scope of the present disclosure. Any modification, equivalent substitution and improvement without departing from the spirit and principle of the present disclosure are within the protection scope of the present disclosure.

What is claimed is:

1. A method for implementing a firewall cluster, comprising:

monitoring, by a Software Defined Network (SDN) controller, a load of one or more Virtual FireWall (vFW) nodes in the firewall cluster in real time;

when detecting that the load of one or more vFW nodes is higher than a predefined first threshold, creating, by the SDN controller, a new vFW node; and selecting, by the SDN controller, a first flow, which is to be migrated, from flows passing through the monitored one or more vFW nodes, sending an identity of the first flow and an identity of the new vFW node to the monitored one or more vFW nodes, updating a first flow entry corresponding to the first flow after receiving a first notification message, and sending the updated first flow entry to a switch, wherein the first notification message indicates that the vFW node through which the first flow passes synchronizes session information corresponding to the first slow to the new vFW node, and the updated first flow entry indicates the switch to send the first flow to the new vFW node, when detecting that the load of one or more vFW nodes is lower than a predefined second threshold, the method further comprising:

selecting, by the SDN controller, a to-be-removed vFW node from the one or more vFW nodes of which load is lower than the predefined second threshold, determining a second flow passing through the to-be-removed vFW node as a to-be-migrated flow, determining a destination vFW node to which the second flow is to be migrated, and sending an identity of the second flow and an identity of the destination vFW node to the to-be-removed vFW node; and updating, by the SDN controller, a second flow entry corresponding to the second flow after receiving a second notification message, and sending the updated second flow entry to the switch, wherein the second notification message indicates that the to-be-removed vFW node synchronizes session information corresponding to the second flow to the destination vFW node, and the updated second flow entry indicates the switch to send the second flow to the destination vFW node.

2. The method of claim 1, wherein updating the first flow entry corresponding to the first flow comprises:

changing a next hop in the first flow entry into the new vFW node.

3. The method of claim 1, wherein updating the second flow entry corresponding to the second flow comprises:

changing a next hop in the second flow entry into the destination vFW node.

4. The method of claim 1, when one or more vFW nodes in the firewall cluster do not have a Network Address Translation (NAT) service and a Virtual Private Network (VPN) service, further comprising:

when receiving a flow packet sent by the switch, selecting, by the SDN controller, a vFW node from the one or more vFW nodes according to a HASH algorithm and notifying the switch of the selected vFW node, so that the switch forwards the flow packet to the selected vFW node.

5. The method of claim 1, when one or more vFW nodes in the firewall cluster have a NAT service and a VPN service, further comprising:

assigning, by the SDN controller, NAT addresses in a NAT address pool to the vFW nodes; and when receiving a flow packet sent by the switch, parsing out, by the SDN controller, a VPN packet from the flow packet, searching for a vFW node corresponding to a destination address of the VPN packet, generating a flow entry and sending the generated flow entry to the switch, wherein the destination address of the VPN packet is a NAT address and the generated flow entry indicates the switch to forward the VPN packet to the searched-out vFW node.

6. A Software Defined Network (SDN) controller, comprising a processor and a non-transitory machine readable storage medium storing machine readable instructions which are executed by the processor to:

monitor a load of one or more Virtual FireWall (vFW) nodes in a firewall cluster in real time; when detecting that load of one or more vFW nodes is higher than a predefined first threshold, create a new vFW node; and select a first flow, which is to be migrated, from flows passing through the monitored one or more vFW nodes, notify the monitored one or more vFW nodes of an identity of the first flow and an identity of the new vFW node, update a first flow entry corresponding to the first flow after receiving a first notification message, and send the updated first flow entry to a switch, wherein the first notification message indicates that the vFW node through which the first flow passes synchronizes session information corresponding to the first flow to the new vFW node, and the updated first flow entry indicates the switch to send the first flow to the new vFW node, when detecting that the load of one or more vFW nodes is lower than a predefined second threshold, the machine readable instructions further cause the processor to:

select a to-be-removed vFW node from the one or more vFW nodes of which load is lower than the predefined second threshold; and determine a second flow passing through the to-be-removed vFW node as a to-be-migrated flow, determine a destination vFW node to which the second flow is to be migrated, and send an identity of the second flow and an identity of the destination vFW node to the to-be-removed vFW node;

update a second flow entry corresponding to the second flow after receiving a second notification message, and send the updated second flow entry to the switch, wherein the second notification message indicates that the to-be-removed vFW node synchronizes session information corresponding to the second flow to the destination vFW node, and the updated second flow entry indicates the switch to send the second flow to the destination vFW node.

7. The SDN controller of claim 6, wherein, in order to update the first flow entry corresponding to the first flow, the machine readable instructions further cause the processor to:

change a next hop in the first flow entry into the new vFW node.

8. The SDN controller of claim 6, wherein, in order to update the second flow entry corresponding to the second flow, the machine readable instructions further cause the processor to:

change a next hop in the second flow entry into the destination vFW node.

9. The SDN controller of claim 6, wherein, when one or more vFW nodes in the firewall cluster do not have a Network Address Translation (NAT) service and a Virtual Private Network (VPN) service, the machine readable instructions further cause the processor to:

when receiving a flow packet sent by the switch, select a vFW node from the one or more vFW nodes according to a HASH algorithm and notify the switch of the selected vFW node, so that the switch forwards the flow packet to the selected vFW node.

10. The SDN controller of claim 6, wherein, when one or more vFW nodes in the firewall cluster have a NAT service and a VPN service, the machine readable instructions further cause the processor to:

assign NAT addresses in a NAT address pool to the vFW nodes; and when receiving a flow packet sent by the switch, parse out a VPN packet from the flow packet, search for a vFW node corresponding to a destination address of the VPN packet, generate a flow entry and send the generated flow entry to the switch, wherein the destination address of the VPN packet is a NAT address and the generated flow entry indicates the switch to forward the VPN packet to the searched-out vFW node.

* * * * *